Sept. 1, 1964  T. J. LYNCH  3,147,449
PULSE DURATION MODULATOR
Filed Nov. 17, 1959
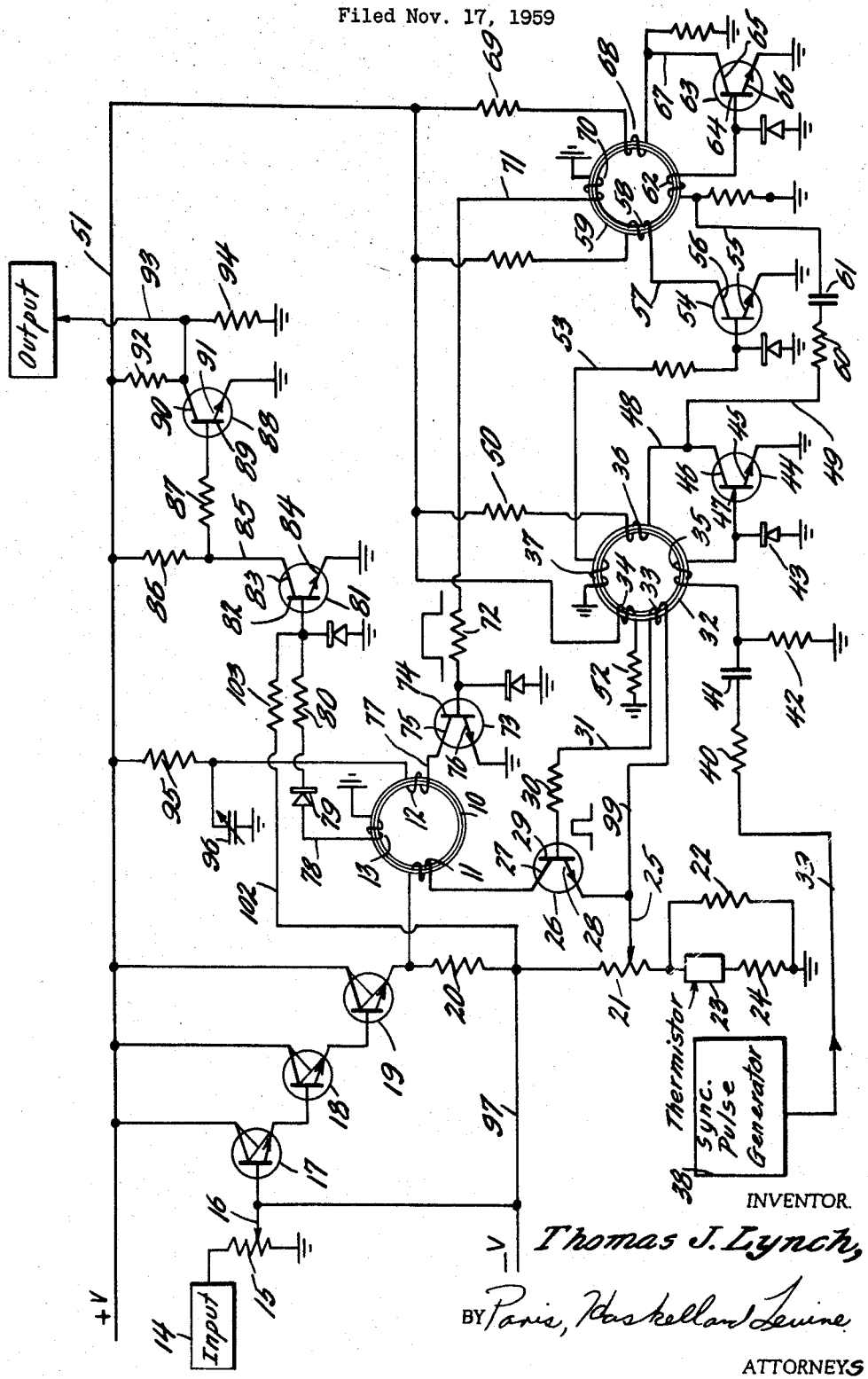
INVENTOR.
Thomas J. Lynch,
BY Paris, Haskell and Levine
ATTORNEYS United States Patent Office
3,147,449
Patented Sept. 1, 1964

3,147,449
PULSE DURATION MODULATOR
Thomas J. Lynch, Philadelphia, Pa., assignor, by mesne assignments, to United Aircraft Corporation, a corporation of Delaware
Filed Nov. 17, 1959, Ser. No. 853,589
10 Claims. (Cl. 332—12)

This invention generally relates to improvements in translating means for converting variable amplitude signals into a series of pulse duration modulated (PDM) impulses being produced at a frequency controlled by a synchronizing source.

Although translating devices of this kind have many applications, they are particularly well suited for use in telemetering systems of the type wherein a plurality of signals obtained at one location are to be transmitted to a remote location over a single transmission channel and such signals are transmitted in a time sequence that is synchronized at both transmitting and receiving locations. In such telemetering applications, these devices are known as keyers.

However, known telemetering keyers do not possess the small size, lightweight, dependability, and accuracy as is now needed for long range communication between aircraft or missiles and ground based locations since many employ conventional electron tube circuits that are relatively undependable and not suited for use in environments subject to shock, rapid acceleration and other adverse conditions. Of the known keyer types other than the electron tube varieties, difficulties have also been had in obtaining the degree of linearity needed as well as obtaining devices that otherwise satisfy the more severe requirements of present day aircraft and missile usage.

Generally according to the present invention, there is provided a keyer or translating means to perform this function that is comprised completely of solid state components, such as magnetic cores and transistors, in such arrangement as to provide the small size and lightweight needed as well as possessing improved linearity and otherwise providing improved performance. In its overall aspects, this invention makes use of the technique of converting a continuous signal into variable duration pulses by periodically sampling and storing the amplitude of the signal on a magnetic core having square wave characteristics and in between each such sampling, reading out the energy stored on the core in the form of variable time width impulses. To control the sampling or read-in of the information, as well as the read-out thereof, all in synchronism with a timing source, additional magnetic core and transistor circuits are employed in a unique circuit arrangement making optimum use of the square hysteresis loop characteristics of the newer magnetic materials to achieve the improved linearity and overall performance desired.

It is accordingly a principal object of the invention to provide an extremely linear translating system for converting a varying signal into a series of pulse width modulated impulses.

A further object is to provide such a system comprised exclusively of solid state components.

A still further object is to provide such a system of minimum size, weight, and complexity and maximum dependability.

Still another object is to provide such a system having characteristics particularly well adapted for use in high speed telemetering systems or like applications.

Other objects and many additional advantages will be more readily understood by those skilled in the art after a detailed consideration of the following specification taken with the accompanying electrical schematic drawing illustrating one preferred system according to the present invention.

Referring now to the drawing, there is shown a saturable magnetic core 10 of material having square hysteresis loop characteristics and being provided with an input winding 11, a read-out winding 12 and an output winding 13. A variable amplitude input signal obtained from a source generally indicated at 14 is adapted to be periodically applied to the input winding 11, with each application thereof being for a constant duration time interval whereby for each such sampling of the input signal from 14, the degree of partial magnetic saturation of the core 10 is varied in a forward direction from an initially established condition to a condition linearly proportional to the amplitude of the signal from 14.

After each such application of the input signal 14, there is applied to the reset winding or read-out winding 12 of core 10 in an opposite magnetizing direction an elongated impulse of constant amplitude and fixed duration which posseses an overall volt-time area that is always sufficient to reset the core 10 to its initial condition of saturation in the reverse direction. As this reset pulse is applied to winding 12 and proceeds to reverse or reset the core, a changing flux passes through the core 10 and induces a voltage in output winding 13. Since the reset pulse has a square waveshape of constant amplitude, the output voltage being produced by winding 13 is also a square wave of constant amplitude.

However, the reset pulse being directed to winding 12 may be considered as a constant magnetizing current applied for a relatively long time period and operating to progressively reverse the degree of saturation of the core until the core is restored to its initial condition. Since the degree of partial saturation of the core 10 in the forward direction is controlled by the amplitude of the input signal from source 14, the amount of reset current necessary to restore the core is also variable in the same proportion, whereby the core 10 is restored to its initial condition before the termination of the reset pulse and at a different time instant, depending upon the amplitude of the sampled input signal from 14. As the core is restored and becomes fully saturated in the reverse direction, the continued application of the remainder of the fixed reset pulse to winding 12 does not produce any further change in flux through the core 10 whereby the induced voltage in output winding 13 is terminated at a variable time before the ending of the reset impulse, which time is directly proportional to the amplitude of the sampled input signal stored on the core 10. Thus, the output impulse being produced by output winding 13 has a constant amplitude but a variable duration that is directly proportional to the amplitude of the sampled input signal from source 14.

Briefly recapitulating this operation, input signals from source 14 are periodically applied to the input winding 11 of core 10 for fixed time duration whereby for each sampling of the input signal the core is partially saturated in the forward direction in proportion to the amplitude of the sampled signal. After each such sampling of the input 14, a resetting pulse is applied to winding 12 in the reverse direction to restore the core 10 to its initial state of saturation. Each resetting pulse is applied to the winding 12 for a fixed time duration, but effects the resetting of the core before the ending of the reset pulse at variable times depending upon the degree of forward saturation. Consequently, the output pulse being produced over winding 13 during the resetting of the core 10, likewise has a variable time duration depending upon the degree of forward saturation; or in other words, depending upon the amplitude of the sampled input signals from source 14.

Returning to the drawing for further details of the preferred circuitry, the input signal from source 14 in a telemetry system is usually obtained from high impedance sources and consequently it is necessary to couple this signal through an isolating and impedance reducing circuit to correspond with the relatively low impedance of input winding 11. For this purpose, the input signal is directed across a resistance potential divider 15, and the movable tap 16 thereof is connected to the base element of the first transistor 17 connected in a multiple emitter-follower circuit, comprising three cascaded transistors 17, 18, and 19.

After passing through the cascaded transistors 17, 18, and 19, which as known in the art, function to successively reduce the impedance while transmitting the signal, the signal appears across a resistor 20 and is directed to the upper terminal of input winding 11. Since input winding 11 possesses a low impedance, the cascaded transistors isolate and impedance match the high input impedance of the source 14 with the low impedance of winding 11.

Completing the input signal circuit, the input signal is also directed in series with potentiometer 21 and a parallel network comprising a resistor 22 paralleled by a thermistor 23 and resistor 24, and thence leading to ground. The function of thermistor 23 in this connection is to compensate for the effect of temperature variation on the transistors in the circuit whereby the signal potential appearing across resistor 20 and potentiometer 21 remains linearly proportional to the input signal from source 14 despite temperature change.

To periodically control the application of the input signal from source 14 to the input winding 11 as described above, there is provided a transistor 26 operating as a switch in series circuit between the opposite terminal of winding 11 and the signal voltage across resistor 20 and potentiometer 21. More specifically, the input winding 11 is connected in series with the collector-emitter junction of transistor 26 and across resistor 20 and potentiometer 21.

Energizing the base element 29 of transistor 26 to periodically permit current flow through the transistor and hence through the input winding 11, there is provided a pulse former circuit, including a saturable core 32, which is adapted to be periodically energized by a pulse source 38, thereby to transmit a fixed waveform impulse over line 31 and through resistor 30 to the base element 29 of transistor 26. In other words, the transistor 26 and pulse former circuit together function as a gate in response to each sync pulse being produced by a generator 38 thereby periodically connecting the input signal from source 14 to the input winding 11 in synchronism with each sync pulse from 38.

As shown, the pulse former circuit comprises a saturable core 32 of material having a square hysteresis loop characteristic and being provided with an input winding 35, a feedback winding 36, a resetting winding 34 and a pair of output windings 33 and 37. In operation, each sync pulse being produced by generator 38 is directed over line 39 and through resistor 40 and capacitor 41 to the input winding 35 and thence to the base element 47 of transistor 44. In passing through winding 35, this pulse begins to saturate core 32 in the reverse direction and also renders transistor 44 conducting permitting current to flow from the collector to the emitter element thereof from the positive D.-C. potential line 51 and through resistor 50 and feedback winding 36 in a direction to aid the reverse saturation of the core. As current flows through feedback winding 36, the flux change produced in core 32 induces a voltage in the input winding 35 in a regenerative direction to maintain a positive potential on the base element 47 of transistor 44 and thereby maintain transistor 44 conducting from emitter to collector elements. This enables the D.-C. current to continue to flow through feedback winding 36 whereby the core 32 is progressively saturated until it reaches a fully saturated condition in the reverse direction after a predetermined interval of time determined by the design of the core 32, windings, and D.-C. energizing source. However when the core 32 becomes fully saturated in the reverse direction, the D.-C. current flow through feedback winding 36 ceases to produce a flux change in the core whereby the induced voltage across input winding 35 falls to zero and current conduction through transistor 44 and hence winding 36 is terminated to complete operation of the pulse former circuit. Consequently the pulse former circuit responds to an initiating sync pulse from generator 38 to produce a constant waveform output pulse over lines 31 and 99 serving to open the gate transistor 26 and permit the input signal from source 14 to be applied across the input winding 11 or core 10 for a predetermined short time interval.

This pulse former circuit is thereafter automatically reset to its initial state of saturation to respond in the same manner to the next sync pulse by means of reset winding 34 which is connected to the D.-C. power line 51 to receive current and again reverse the saturation of core 32 to its initial condition. Although reset winding 34 is continuously energized by D.-C. line 51 and continuously produces a magnetizing force in opposition to that of feedback winding 36, a current limiting resistor 52 limits the D.-C. current therethrough whereby during operation of the pulse former in response to the sync pulse, as described above, the magnetizing force being produced by winding 36 predominates over that of winding 34 enabling the circuit to function in the manner described above. However, as will be recalled, after each operation of the pulse former, the current through winding 36 is cut off, and at this time the energized winding 34 takes over to reset the core 32 in the interval before the next sync pulse is received, thereby restoring the core 32 to its initial saturation condition and readying the pulse former circuit to respond to the next succeeding sync pulse.

As thus far described, therefore, there is provided means for sequentially applying the input signal from 14 to the winding 11 on core 10, as controlled by the sync pulse generator 38. After each such sampling or read-in of the input signal from source 14, it is desired that a variable width pulse be produced in the output circuit in linear proportion to the amplitude of the sampled input signal from 14. To supply this read-out function, there is provided a second pulse former that operates after each sampling of the input signal to read-out the energy stored on the core 10 in the form of a constant amplitude and variable width impulse.

Returning to the drawing, this second pulse former circuit preferably comprises a saturable core 59 having an input winding 62, feedback winding 68, output winding 70, and reset winding 58; all of which function in a manner substantially identical with the first pulse former circuit. However, the input winding 62 of the second pulse former is not connected to the sync pulse generator 38 as in the first pulse former circuit, but rather is connected to the collector element 46 of transistor 44 in the feedback circuit of the first pulse former and consequently, is time delayed to respond after the termination of operation of the first pulse former. Tracing this circuit for an understanding of this time delayed functioning, during the operation of the first pulse former circuit, the transistor 44 is made conducting and its collector element 46 is therefore at substantially ground potential. After termination of operation thereof, the transistor 44 is made non-conducting and the potential at its collector element rapidly rises to the D.-C. potential of line 51. This rapid rise from ground to the positive potential of line 51 produces a positive output pulse over line 49 which is directed through resistor 60 and capacitor 61 to the input winding 62 of the second pulse former thereby triggering the second pulse former into operation and producing a fixed waveform impulse from output winding 70 and over output line 71. The second pulse former is so designed that its pulse width is considerably larger than that being produced by the first pulse former circuit and it therefore contains sufficient energy to always reverse the direction of saturation of core 10. This read-out impulse being directed over line 71 thence passes through resistor 72 and is applied to the base element 74 of transistor 73 thereby rendering transistor 73 conducting from its collector to its emitter elements and permitting current to flow from D.-C. potential line 51 through resistor 95 and through read-out winding 12 on core 10. Depending upon the degree of partial forward saturation of core 10 as stored thereon by the sampled input source 14, the read-out pulse being applied to winding 12 reverses the direction of saturation of core 10 to its initial condition at a different time interval before the ending of the read-out pulse whereby the output signal from core 10 being produced across output winding 13 has a constant amplitude but different pulse width in direction proportion to the amplitude of the read-in signal applied to winding 11.

More specifically, the read-out pulse is applied to winding 12 in opposition to the read-in pulse earlier applied to winding 11. Upon the application of this read-out pulse to winding 12, a magnetizing force is exerted on the core in a reverse direction to restore the core to its initial condition. However, the energy needed to restore the core is equal to the energy previously read-in which, in turn, was variable depending upon the amplitude of the input signal from 14. Consequently during read-out, only a portion of the energy from the constant waveform read-out pulse produces a flux change in the core 10 and the remaining portion thereof produces no flux change. Since the output winding 13 responds only to a flux change in the core 10, the output pulse being generated thereby has a variable pulse width that is proportional to the amplitude of the read-in signal from 14.

This variable output pulse from winding 13 is thence directed over line 78 and through diode 79 and resistor 80 to the base 82 of transistor 81 serving as an isolating amplifier, and the output signal therefrom is directed through a second transistor 88 and finally over line 93 to the output load circuit.

As discussed above, the first pulse former circuit including core 32 is automatically reset by winding 34 during the interval between sync pulses from generator 38, thereby to enable repeated periodic sampling of the input signal from source 14 to the input winding 11 of core 10.

During each operation of the first pulse former circuit, an output pulse is also generated from a second output winding 37 on core 32 and this pulse is directed over line 53 to ultimately control the resetting of the second pulse former core 59.

More specifically, during each operation of the first pulse former circuit, a constant waveshape impulse from winding 37 is directed over line 53 and to the base element of a transistor 54. This pulse renders transistor 54 conducting and enables current flow from D.-C. power line 51 and through reset winding 58 and the collector to emitter junction of transistor 54 to ground. This D.-C. current through winding 58 serves to reset the core 59 to its initial state of saturation, thereby conditioning the second pulse former for operation after the termination of operation of the first pulse former circuit as described above.

Since the sampling of the input signal and the translation of its amplitude into impulses of varying pulse width according to the present invention is repeatedly performed in response to and in synchronism with the sync pulse generator 38, it is believed evident that this translation may be performed periodically or aperiodically as desired and at widely different rates of speed or frequencies as controlled by the generator 38 and the design of the magnetic circuits.

What is claimed is:

1. In a telemetering keyer circuit for sampling the amplitude of a variable amplitude input signal at given predetermined time intervals and converting the sampled signal into a series of constant amplitude pulses having a pulse width proportional to the sampled amplitude thereof, a magnetic core having input windings and an output winding, a first magnetic pulse former for producing an impulse of constant duration and a transistor gate circuit responsive thereto, means connecting said input signal in circuit with the gate circuit and with an input winding of said core, a second magnetic pulse former responsive to said first pulse former for producing a constant amplitude and constant duration impulse at the termination of the impulse from the first pulse former, means applying the impulse from said second pulse former to another input winding on said core in a direction and for a duration to fully saturate the core in the reverse direction, cyclically operating means for repetitively energizing said first pulse former circuit, and means responsive to the output winding on said core to transmit a series of constant amplitude variable duration impulses during operation of the second pulse former and in time delayed synchronized relationship to said cyclically operating means.

2. In a digitizer for producing a series of constant amplitude and variable time duration pulses proportional to the amplitude variation of a variable amplitude analog input signal, a saturable core having a substantially square hysteresis loop characteristic, control means energized by a repetitively operating generator for storing said input signal on said core by recurring impulses of constant duration and variable amplitude proportional to the instantaneous amplitude of said signal at the time instant of each pulse, and a second control means actuated by said first control means for resettting the core after the application of each input signal impulse, said second control means producing constant amplitude impulses of sufficient volt time area to reverse the saturation of the core from one state of saturation to the other state of saturation.

3. A time synchronized pulse duration modulator comprising a saturable core having substantially square hysteresis loop characteristics, an input winding on said core and a voltage controlled switch means, means applying an input signal of time varying amplitude to said input winding and through said switch means whereby said input signal is applied to said input winding when the switch means is closed, repetitively operating means for cyclically energizing said switch means to close for fixed time intervals thereby to partially saturate the core during each said time interval in proportion to the amplitude of the time variable input signal, second energizing means repetitively operable in response to and after the termination of each of said fixed time intervals to reset the core to its initial state of saturation by applying thereto an impulse of constant amplitude and relatively long duration, and an output winding on said core for producing a series of constant amplitude output pulses during the application of each of said reset pulses with each pulse and having a time duration proportional to the amplitude of said applied input signal during the previously applied fixed time interval, said switch means including a transistor and said first energizing means including a magnetic pulse former producing a fixed waveform impulse responsively to the application of an initiating impulse, said means for applying the input pulse to said input winding including a thermistor for compensating for the change in characteristics of the modulator with temperature variation.

4. In the modulator of claim 3 said input signal applying means including an impedance matching means for coupling a high impedance input signal generator to a low impedance input winding in said core.

5. In a circuit for translating a time variable amplitude input signal into a series of pulse duration modulated impulses being produced in synchronism with an automatically cycling timing source, a saturable core of square hysteresis loop characteristics and having a plurality of windings thereon, means responsive to said timing source for repetitively applying said input signal to one of said windings for constant time duration periods and at fixed time intervals, means controlled by said timing source and operating in between each said input signal applications to reset the core by applying a constant amplitude and fixed duration impulse to a winding thereon, and output means connected with a winding on said core and responsive to flux change in the core during the resetting thereof to transmit said series of variable time duration impulses, said circuit being comprised exclusively of solid state components, and temperature compensating means included in said input signal applying means for varying the amplitude of the input signal applied to the input winding proportionally to the temperature, thereby to compensate for spurious variation in the circuit due to temperature change.

6. In a digitizer for producing a regular time series of constant amplitude pulses of variable time duration proportional to the amplitude variations of an input signal, a magnetic storage circuit including a saturable core, a first control means including a pulse former circuit energizable by a repetitively operating pulse generator for periodically applying increments of said input signal for constant time durations to variably saturate said core, and a second control means including a pulse former circuit and being periodically energized during the time interval between successive energizations of the first control means for reversely energizing said core with constant amplitude pulses to reset the core to its original state of saturation, whereby output means associated with the core produce a regular time series of output pulses of constant amplitude having variable time durations proportional to the variations of the input signal, said second control means being periodically energized by said first control means after each successive operation of the first control means.

7. In the digitizer of claim 6, said core having a low impedance input winding and said first control means having a plurality of solid state elements in cascaded relation forming a high impedance to low impedance coupling system for coupling said input signal from a high impedance source to said low impedance input winding on said saturable core.

8. In the digitizer of claim 6, said first control means pulse former comprising a saturable core having a plurality of windings therein, a transistor having emitter and collector elements in series with one of said windings and base and emitter elements connected to another of said windings in opposite poled relationship with the first mentioned winding, said second control means pulse former having the same elements as the first pulse former, and an electrical connection between the emitter element of the first pulse former and the base element of the second pulse former whereby the second pulse former is triggered into operation by the first pulse former after each successive operation of the first pulse former.

9. In the digitizer of claim 6, said first control means pulse former and said second control means pulse former being in cascaded relationship and each including a saturable core and a solid state switching means whereby successive actuations of said first control means responsive to said repetitively operating pulse generator triggers successive operations of said second control means in the time interval between successive operations of said first control means.

10. A pulse width modulator comprising: an impedance matching circuit including a temperature compensating impedance energizable by a varying amplitude input signal, a saturable core having a plurality of windings, a first switch means being repetitively operated for fixed time intervals to couple said impedance matching circuit to one of the windings thereby to apply increments of said input signal to the core, a second switch means being repetitively operated for second fixed time alternately between successive operations of said first switch means to reset the core, said second switch means being actuated by said first switch means, whereby the temperature compensating impedance corrects for variations in the circuit resulting from changes in temperature.

References Cited in the file of this patent
UNITED STATES PATENTS

| | | |
|---|---|---|
| 2,341,013 | Black | Feb. 8, 1944 |
| 2,780,782 | Bright | Feb. 5, 1957 |
| 2,784,391 | Rajchman et al. | Mar. 5, 1957 |
| 2,808,578 | Goodell et al. | Oct. 1, 1957 |
| 2,871,376 | Kretzmer | Jan. 27, 1959 |
| 2,892,970 | Sims | June 30, 1959 |
| 2,925,958 | Polzin et al. | Feb. 23, 1960 |
| 2,941,196 | Raynsford et al. | June 14, 1960 |
| 2,947,879 | Henle et al. | Aug. 2, 1960 |
| 3,027,547 | Froehlich | Mar. 27, 1962 |